(12) United States Patent
Persechino et al.

(10) Patent No.: US 12,312,062 B2
(45) Date of Patent: May 27, 2025

(54) TACTICAL HYBRID STRATOSPHERIC AIRSHIP

(71) Applicant: C.I.R.A. (CENTRO ITALIANO RICERCHE AEROSPAZIALI)—S.C.P.A., Capua (IT)

(72) Inventors: Giuseppe Persechino, Capua (IT); Vincenzo Rosario Baraniello, Capua (IT); Roberto Borsa, Capua (IT)

(73) Assignee: C.I.R.A. (Centro Italiano Ricerche Aerospaziali)—S.C.P.A., Capua (IT)

( * ) Notice: Subject to any disclaimer, the term of this patent is extended or adjusted under 35 U.S.C. 154(b) by 0 days.

(21) Appl. No.: 18/011,987

(22) PCT Filed: Jun. 16, 2021

(86) PCT No.: PCT/IB2021/055320
§ 371 (c)(1),
(2) Date: Dec. 21, 2022

(87) PCT Pub. No.: WO2022/003468
PCT Pub. Date: Jan. 6, 2022

(65) Prior Publication Data
US 2023/0234693 A1 Jul. 27, 2023

(30) Foreign Application Priority Data

Jul. 1, 2020 (IT) .......................... 102020000015880

(51) Int. Cl.
*B64B 1/20* (2006.01)
*B64B 1/08* (2006.01)
*B64B 1/32* (2006.01)

(52) U.S. Cl.
CPC ............... *B64B 1/20* (2013.01); *B64B 1/08* (2013.01); *B64B 1/32* (2013.01); *B64B 2201/00* (2013.01)

(58) Field of Classification Search
CPC ......... B64B 1/20; B64B 2201/00; B64C 1/34; B64C 3/30
See application file for complete search history.

(56) References Cited

U.S. PATENT DOCUMENTS 4,725,021 A * 2/1988 Priddy ...................... B64C 3/30
244/219
5,005,783 A * 4/1991 Taylor ...................... B64C 1/34
244/96

(Continued)

FOREIGN PATENT DOCUMENTS

CN 106240785 A * 12/2016
CN 205931211 U 2/2017

(Continued)

OTHER PUBLICATIONS

International Search Report dated Oct. 15, 2021, in International Application No. PCT/IB2021/055320, 5 pages.

(Continued)

*Primary Examiner* — Joseph W Sanderson
(74) *Attorney, Agent, or Firm* — Maier & Maier, PLLC (57) ABSTRACT

A hybrid stratospheric airship for the combined and optimized use of aerostatic and aerodynamic force, including: an inflatable central body; a first and second inflatable wing extending from the central body protruding laterally from two opposite sides of the central body, each wing having a portion proximal to the central body, an end portion distal from said central body, a leading edge, and a trailing edge; an outer shell having a main shell portion associated with the main body, and a first and a second side shell portion associated with each wing, respectively; at least one main (Continued)

spar extending transversely to the central body, which supports the first and second wing and crosses the central body, the at least one main spar a rectilinear spar interposed between the leading edge and the trailing edge of the first and second wings, and connected to the distal end portions of the wings.

12 Claims, 8 Drawing Sheets

(56) References Cited

U.S. PATENT DOCUMENTS

| | | | | |
|---|---|---|---|---|
| 5,681,010 | A * | 10/1997 | Jensen | B64C 1/34 244/49 |
| 5,725,709 | A * | 3/1998 | Jensen | B64D 33/02 156/169 |
| 6,196,498 | B1 * | 3/2001 | Eichstedt | B64B 1/20 244/25 |
| 6,315,242 | B1 * | 11/2001 | Eichstedt | B64B 1/02 244/30 |
| 6,860,449 | B1 | 1/2005 | Chen | |
| 7,040,572 | B2 * | 5/2006 | Munk | B64B 1/02 244/30 |
| 7,306,187 | B2 | 12/2007 | Lavan | |
| 7,866,601 | B2 * | 1/2011 | Balaskovic | B64B 1/12 244/30 |
| 8,596,571 | B2 * | 12/2013 | Goelet | B64B 1/00 244/30 |
| 8,622,337 | B2 * | 1/2014 | Hariri | B64B 1/22 244/30 |
| 9,428,257 | B2 * | 8/2016 | Nelson | B64D 27/24 |
| 10,343,760 | B2 * | 7/2019 | Simonis | B64B 1/62 |
| 10,532,803 | B2 | 1/2020 | Kempshall | |
| 10,676,172 | B1 * | 6/2020 | Keavney | B64C 3/30 |
| 2005/0082426 | A1 * | 4/2005 | Munk | B64B 1/005 244/100 A |
| 2006/0261213 | A1 * | 11/2006 | Lavan | B64C 3/30 244/30 |
| 2008/0179454 | A1 * | 7/2008 | Balaskovic | B64B 1/30 244/30 |
| 2010/0001128 | A1 * | 1/2010 | Morehead | B60V 3/08 244/100 A |
| 2011/0240794 | A1 * | 10/2011 | Hariri | B64B 1/30 244/30 |
| 2012/0248241 | A1 * | 10/2012 | Goelet | B64C 25/32 244/30 |
| 2015/0076279 | A1 * | 3/2015 | Nelson | B64B 1/02 244/30 |
| 2017/0183073 | A1 * | 6/2017 | Simonis | B64B 1/62 |
| 2020/0262536 | A1 * | 8/2020 | Deakin | B64B 1/20 |
| 2021/0129985 | A1 * | 5/2021 | Regev | B64U 10/25 |

FOREIGN PATENT DOCUMENTS

| | | | | |
|---|---|---|---|---|
| CN | 110466739 A | * | 11/2019 | B64C 27/22 |
| GB | 2315054 A | * | 1/1998 | B64C 3/30 |
| WO | 2019064011 A1 | | 4/2019 | |

OTHER PUBLICATIONS

D'Oliveira et al., "High-Altitude Platforms—Present Situation and Technology Trends", J. Aerosp. Technol. Manag., Jul.-Sep. 2016, vol. 8, No. 3, 14 pages.

Gonzalo et al., "On the Capabilities and Limitation of High Altitude Pseudo-Satellites", Progress in Aerospace Sciences, Elsevier Ltd., Mar. 26, 2018, vol. 98, 20 pages.

Office Action issued on Dec. 3, 2024, in corresponding Japanese Application No. 2023-523683, 8 pages.

* cited by examiner

TACTICAL HYBRID STRATOSPHERIC AIRSHIP

The present invention relates to the technical field of stratospheric platforms and more in particular it relates to a hybrid stratospheric airship.

The interest in HAPS (High Altitude Pseudo-Satellite) stratospheric platforms has increased over recent years. This interest is motivated by the analysis of possible applications which benefit from the advantages deriving from the use of a HAPS platform, such as monitoring for land security, precision agriculture, telecommunications and environmental monitoring. Unlike satellites, HAPS stratospheric platforms offer the possibility to observe the Earth's surface on a local scale persistently, i.e. with practically no revisit time, and in proximity, i.e. from a height significantly lower than that of satellites thus providing a much higher image resolution than that provided by satellite remote sensing even installing less performing and cost-effective payloads.

A HAPS is a platform typically able to operate at an altitude of about 18-20 km above the Earth's surface (low stratosphere) and it can normally operate continuously for several months by virtue of the use of photovoltaic energy.

The flight altitude (18-20 km) is very interesting because it is well above the range of altitudes concerned by commercial air traffic, so the impact of HAPS platforms on airways is limited only to the phases of ascent to mission altitude and descent to the landing base. Furthermore, from the point of view of meteorological conditions, the statistical analysis of the present wind conditions shows a minimum of strength precisely in this altitude range. The stratosphere has a temperature profile that rises as altitude increases (unlike the troposphere). This makes this portion of the atmosphere preventing the formation of updrafts and turbulence.

In recent years, several suggestions have been made regarding HAPS platforms. These suggestions can be grouped into three main platform types. The first type, also from a temporal point of view, is represented by stratospheric balloons; the second type is represented by fixed wing-type platforms and, finally, the third type is represented by airship-type platforms.

The stratospheric balloon-type and airship-type platforms are based on the exclusive use of aerostatic force to balance the weight (lighter-than-air), while the fixed wing-type uses only aerodynamic force (higher-than-air) to balance the weight.

Balloon-type platforms have a high ratio of payload weight to the total weight. On the other hand, such balloon-type platforms typically do not have propulsion, nor other directional control systems, and thus do not offer the possibility of setting a predefined trajectory, which is thus determined by wind conditions at various altitudes.

Fixed-wing platforms, on the other hand, are based on configurations with very large wing extensions to increase aerodynamic efficiency and are characterized by very light structures. For the latter reason, the overall weight of fixed-wing type platforms must be limited, reducing the available payload weight to a few kilograms (5-25 kg). Furthermore, the very light structures of these platforms s can cause aeroelasticity problems at low altitudes, during the ascent and descent phases.

The airship-type platforms, on the other hand, are designed for very high payloads (>200 kg) and have a very large size and a very high maximum takeoff weight (MTOW >5000 kg) when compared to balloon-type platforms and fixed-wing-type platforms. Such MTOW is mainly due to the presence of ballonets, which constitute a second inner shell of almost equal size to the outer shell, necessary to compensate for gas expansions as the altitude changes (the volume at altitude can be up to 20 times the volume at sea level). The large size of stratospheric airships makes ground operations difficult, especially in adverse weather conditions, and requires dedicated infrastructure for their deployment and shelter, making their tactical use essentially impossible.

Therefore, two main aspects can be noted from the analysis of the stratospheric platforms of the prior art described above: the first aspect relates to the operation of such platforms, which is strongly influenced by weather conditions such to suggest that they can be deployed only from a limited number of bases in the world; the second aspect relates to the weight available for the payload, which is limited above 25 kg for fixed wing-type platforms, while an airship-type platform is truly convenient only for payloads greater than 250 kg.

U.S. Pat. No. 7,306,187B2 describes an inflatable hybrid stratospheric vehicle that can be launched from a submarine or vessel and is capable of exploiting both aerostatic buoyancy and lift.

Such a vehicle also requires numerous components (such as a regenerative fuel cell, an electrolyzer, water and oxygen tanks, and a vapor recovery system) which, in addition to making the vehicle heavier, also reduce its reliability. Furthermore, the vehicle described in U.S. Pat. No. 7,306,187B2 needs to fly at different altitudes and with different configurations because energetically solar cells have a high power-to-weight ratio, while regenerative fuel cells have a much lower power-to-weight ratio.

In particular, during the day, at an altitude of 21 km, the vehicle has sufficient energy, using the solar cells on the central body and those present on the deployed wings to power the motors, and thus produce the necessary lift even with the wings deployed, and to produce the hydrogen to be used at night as fuel from water with the fuel cell.

On the other hand, at night, since the solar energy is lacking and there is no possibility of storing enough energy to fly at an altitude of 21 km, the vehicle is forced to descend to an altitude of 15 km to take advantage of the greater air density, both for lift and buoyancy, and it is necessary to retract the wings because it does not have enough energy to use them.

In descending to an altitude of 15 km, such a platform comes very close to the altitudes affected by commercial air traffic and could cause interference. Furthermore, if the air traffic management authority were to require segregation of the area affected by the flight of such a platform, a greater volume of airspace would be interdicted to the flight of other aircraft.

In light of the above, it is thus apparent that the vehicle design described in U.S. Pat. No. 7,306,187B2 can be improved in terms of performance and operability by acting both from the point of view of the energy system employed and from the point of view of the aero-structural configuration.

It is an object of the present invention to make available a hybrid stratospheric platform which allows to solve or at least in part avoid the drawbacks discussed above with reference to the prior art.

According to an aspect of the invention, it is a further object, either as an alternative or in addition to the aforementioned object, to provide a hybrid stratospheric platform that allows a reduction in the weight, size, and cost of a stratospheric platform for the same payload and thus can also be employed in tactical-type operations.

According to an aspect of the invention, it is a further object, either as an alternative or in addition to the above objects, to provide a hybrid stratospheric platform which allows improved system reliability relative to the systems of the prior art described above.

According to an aspect of the invention, it is a further object, either as an alternative or in addition to the above objects, to provide a hybrid stratospheric platform which can embark payloads in the 35-100 kg range, as required by many applications.

According to an aspect of the invention, it is a further object, either as an alternative or in addition to the above purposes, to provide a hybrid stratospheric platform having a more efficient aero-structural configuration than platform configurations of the prior art, in particular in the payload range of 35-100 kg.

According to an aspect of the invention, a further object, either as an alternative or in addition to the above objects, is to provide a hybrid airship-type stratospheric platform which is also adapted to payloads of less than 35 kg.

These and other objects are achieved by a hybrid stratospheric airship as defined in the appended claim 1 in its most general form and the dependent claims in several particular embodiments.

The invention will be better understood from the following detailed description of its embodiments, made by way of example and consequently not limiting in any way with reference to the accompanying drawings, in which.

Similar or equivalent elements in the accompanying figures will be indicated by means of the same reference numerals.

Figure 2:
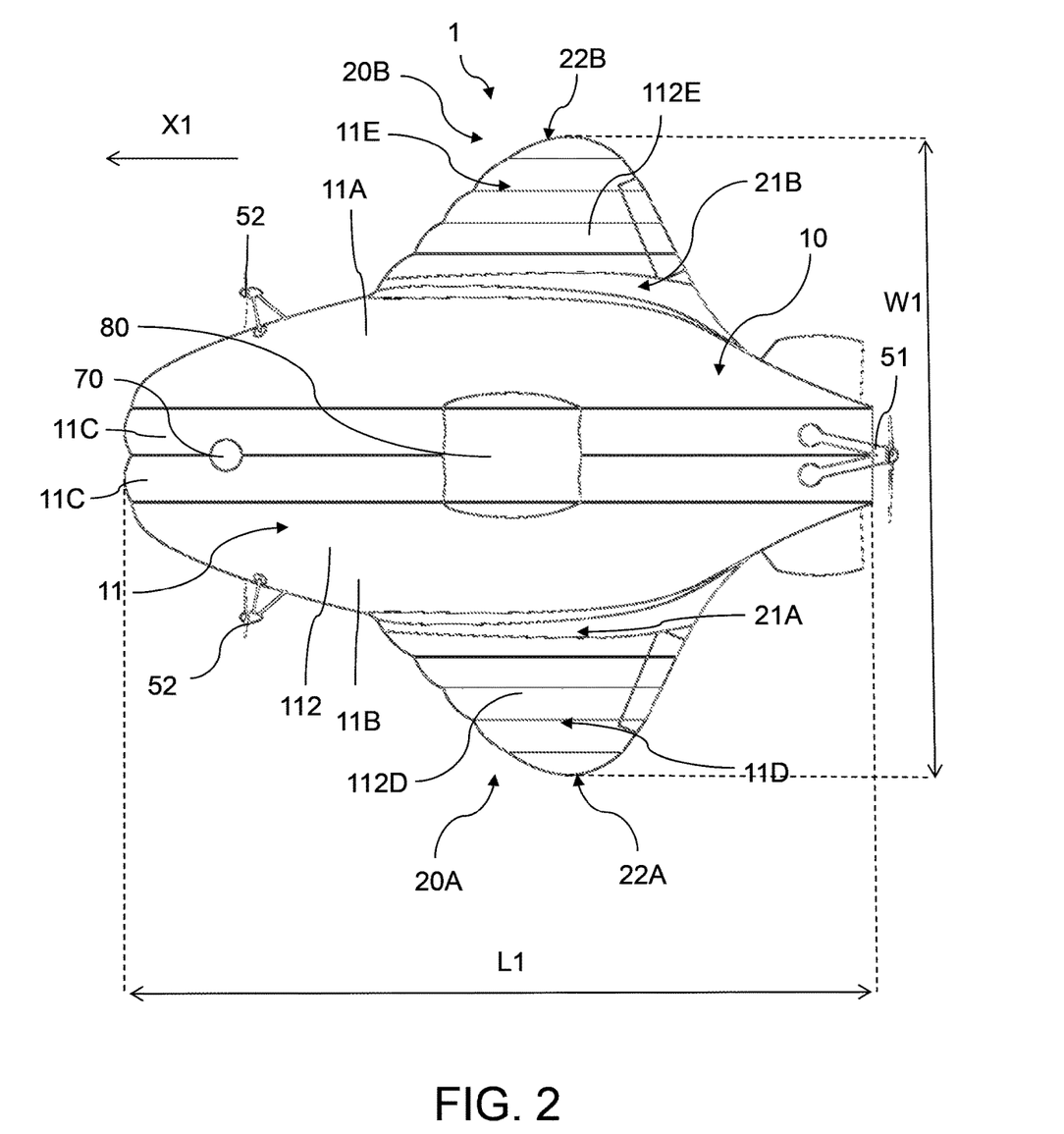
FIG. 2 is a diagrammatic plan view from the bottom of the hybrid stratospheric airship in FIG. 1.
Figure 3:
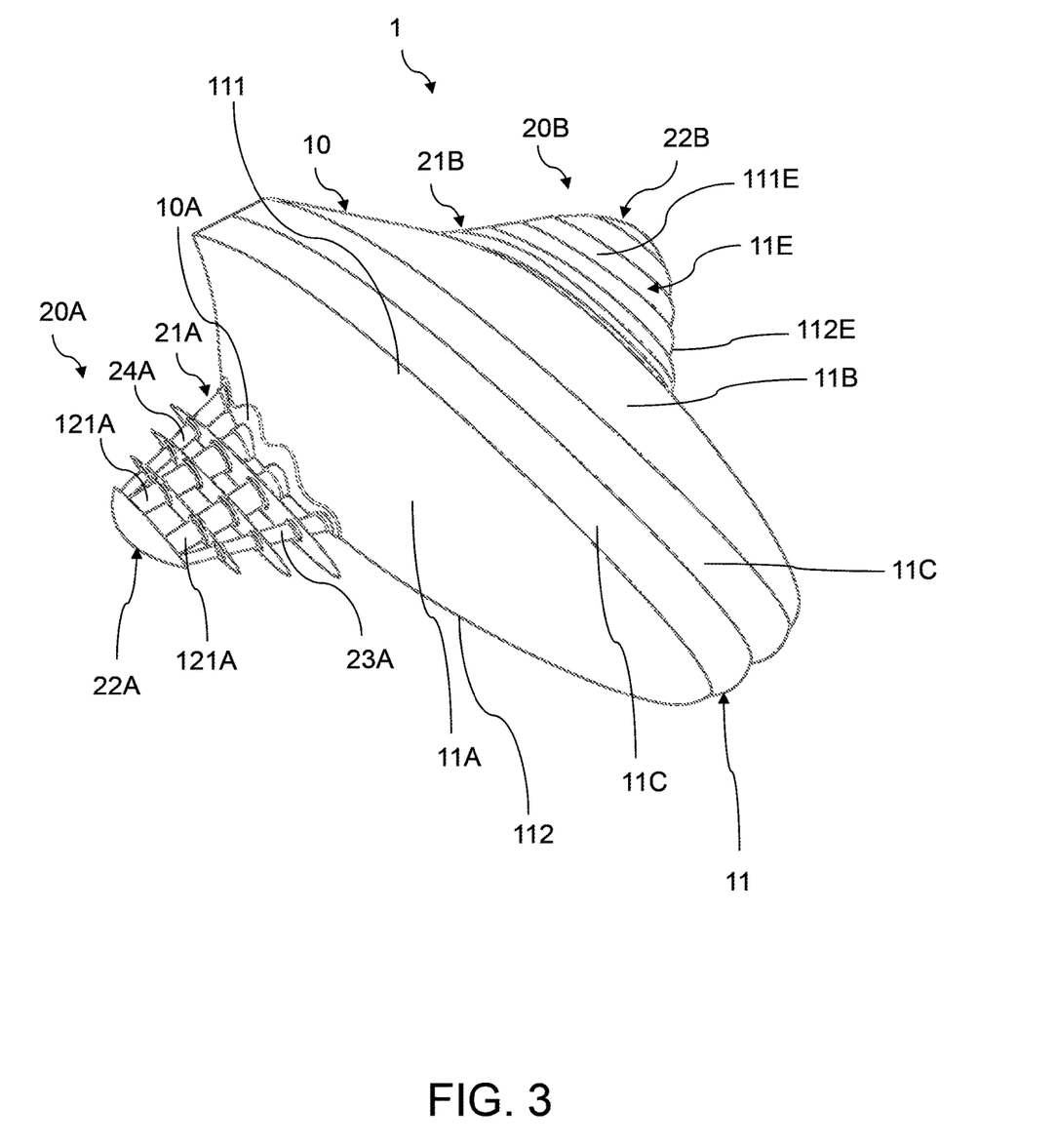
FIG. 3 is a diagrammatic perspective view of the hybrid stratospheric airship in FIG. 1 in which some parts of the airship have been removed.

It is worth noting that for the purposes of the present description, the terms "outer" and "inner" used to describe a hybrid stratospheric airship according to the present invention are intended to refer to the center of such an airship. It is also worth noting that the terms "lower", "upper", "horizontal", "vertical", employed in the following of the present description to describe parts of a hybrid stratospheric airship according to the present invention, are intended to refer to a normal operating condition of such an airship at the assigned mission altitude. Again, the terms "front" and "rear" used in the following of the present description to describe parts of a hybrid stratospheric airship according to the present invention are intended to refer to the advancement direction X1 (FIG. 2) of the airship in a normal operating condition of such an airship at the assigned mission altitude.

With initial reference to FIGS. 1-5, a hybrid stratospheric platform according to a first embodiment is indicated as a whole by reference numeral 1. According to an embodiment, the stratospheric platform 1 is embodied in a hybrid stratospheric airship 1. It is worth noting that the term "airship" used to describe the stratospheric platforms 1 and 1' (FIG. 6) is to be understood in the sense that these platforms have a geometry more similar to that of a stratospheric platform of the airship-type than to that of a fixed-wing stratospheric platform; in other words, they have greater development in the direction of the length than the development in the direction of the wingspan and they also have higher percentage thickness of the profiles used than those typically used for fixed-wing configurations. Indeed, the platforms 1, 1' are definable neither as airship-type fixed-wing stratospheric platforms in themselves. It is also worth noting that for the purposes of this description, the term "hybrid" used to define a stratospheric platform indicates the fact that the stratospheric platform is configured for the joint and optimized use of aerostatic and aerodynamic force. In particular, a hybrid platform is configured to jointly exploit both aerostatic buoyancy and lift. In this regard, it is also worth noting that the airship 1 is conveniently configured to use the aerodynamic force not only to control the airship but also to balance the weight of the airship during various flight phases and, when necessary, to increase the flight altitude. It is also worth noting that in the rest of the present description, the structure of the stratospheric airship 1 will be made with reference to the respective design or mission operational configuration in which the airship 1 is inflated with a gas, preferably helium. According to an embodiment, the airship 1 is a HAPS (High Altitude Pseudo-Satellite) stratospheric platform. According to an embodiment, the airship 1 is a tactical type stratospheric platform, meaning that it can be easily transported inside a standard container and deployed directly to the operational scenario. This is possible by virtue of its small size and MTOW (maximum take-off weight). According to an embodiment, the airship 1 has a length L1 in the 10 m-40 m range, a width W1 in the 8 m-35 m range, an MTOW in the 25 kg-450 kg range and a payload in the 5 kg-100 kg range. In general, the airship 1 can be used in a variety of different application areas, such as but not limited to border monitoring, environmental monitoring, precision agriculture, telecommunications, homeland security and emergency support.

According to an, as will be better understood below in the present description, the airship 1 has a combination of inflatable structural elements 10, 20A, 20B, 12, 23A, 24A, 23B, 24B with different internal pressures, coupled to rigid substructures 10A, 10B, 13A, 22A, 22B, 311A-313A, 321A-323A, 331A-333A (e.g. made of composite materials, aluminum, etc.). According to an embodiment, all inflatable elements of the airship 1 and 1' (FIG. 6) which will be described below in the present description, comprise laminated materials consisting of gas retentive layers, structural layers and protective layers.

Again with reference to FIGS. 1-5, the stratospheric airship 1 comprises an inflatable central body 10 and an inflatable first and second wings 20A, 20B, which extend from the central body 10 projecting laterally from two opposite sides of the central body 10. The wings 20A, 20B are inflatable with a gas, in particular a lighter-than-air gas, preferably helium. According to an embodiment, under the operational conditions of the airship 1 the wings 20A, 20B are fixed wings, i.e., wings that once inflated are not folded during the flight of the airship 1. The central body 10 is a carrier body and is inflatable with a gas, in particular a lighter-than-air gas, preferably helium. According to an embodiment, the central body 10 has a central biconvex lenticular conformation. Each wing 20A, 20B has a proximal end portion 21A, 21B to the central body 10 and a distal end portion 22A, 22B from said central body 10. The distal portions 22A, 22B are essentially the tips 22A, 22B of the wings 20A, 20B. Each wing 20A, 20B comprises a leading edge 201A, 201B and a trailing edge 202A, 202B. According to an embodiment, the tips 22A, 22B are rigid substructures, preferably made of rigid composite material. The wings 20A, 20B, which are aerodynamic elements useful to generate lift, control the platform and reduce induced drag by increasing the aspect ratio (AR) of the system.

Figure 4:
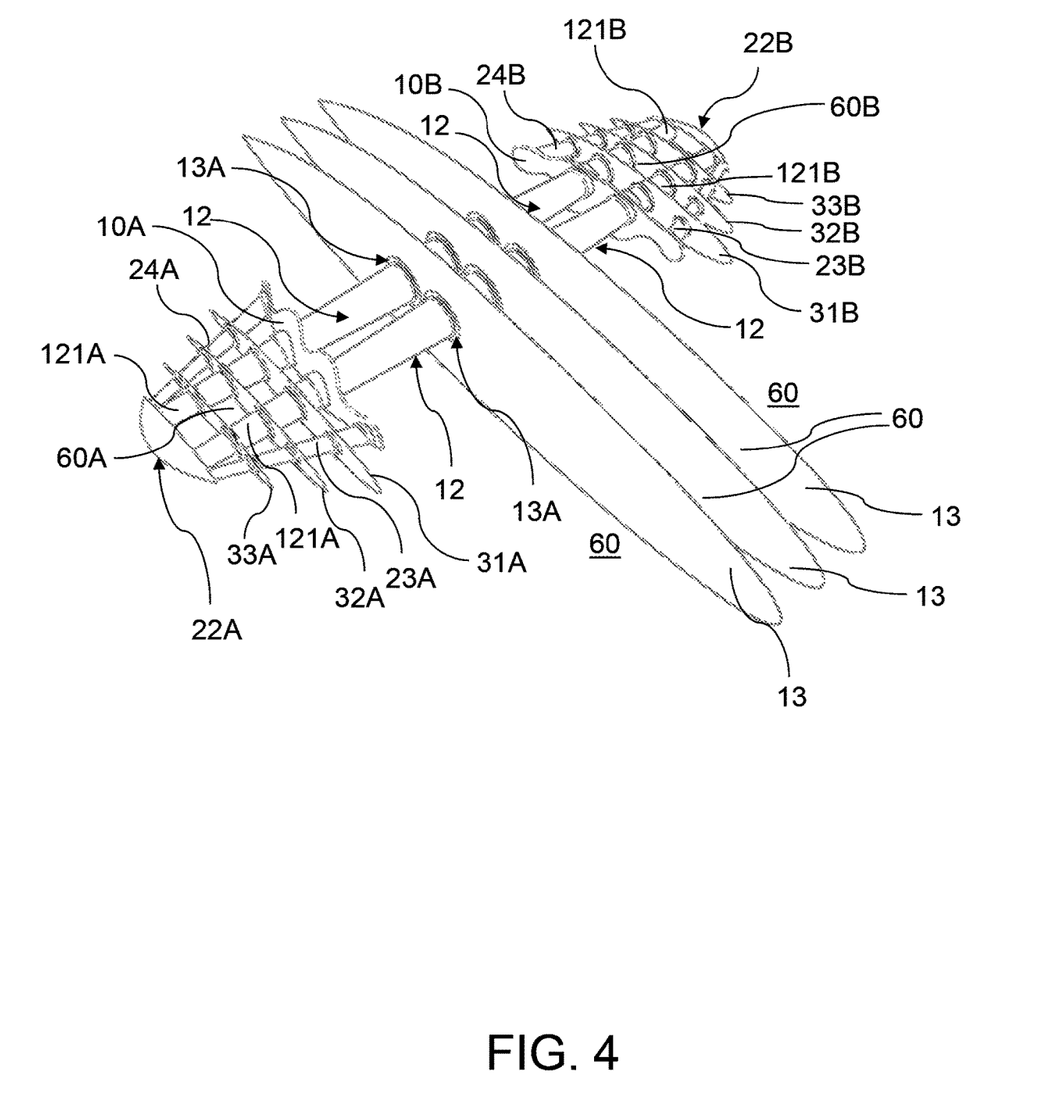
FIG. 4 is a diagrammatic perspective view of the internal structure of the airship in FIG. 1.

With reference to FIG. 4, according to an embodiment, the central body 10, the first wing 20A and the second wing 20B define a central body chamber 60, a first wing chamber 60A, and a second wing chamber 60B, respectively, which are separate from one another and are inflatable in an independent manner.

The airship 1 comprises an outer shell 11 or outer skin 11 having a central shell portion 11A-11C. Furthermore, the outer shell 11 comprises a first side shell portion 11D and a second side shell portion 11E, which are associated with said first and second wing 20A, 20B, respectively. In particular, the central body 10 comprises the central shell portion 11A-11C, while the first and second wings 20A and 20B comprise the first and second side portions 11D and 11E, respectively. In other words, the central shell portion 11A-11C externally delimits the central body 10 while the first side shell portion 11D and the second side shell portion 11E externally delimit the first and second wings 20A, 20B, respectively.

Again with reference to FIGS. 1-5, the airship 1 comprises at least one main spar 12 which extends transversely relative to the main body 10. The spar 12 structurally supports the aforementioned first and second wings 20A, 20B and crosses the central body 10. The main spar 12 is a rectilinear spar, which is interposed between the leading edge 201A, 201B and the trailing edge 201A, 201B of each of the wings 20A, 20B. The spar 12 is connected to the distal end portions 22A, 22B of the wings 20A, 20B. Advantageously, the at least one spar 12 allows a particularly effective absorption of bending loads by joining the tips 22A, 22B of the two wings 20A, 2B and passing inside the central body 10.

According to an embodiment, the main spar 12 comprises two opposite end portions 121A, 121B which extend within the first and second wings 20A, 20B, respectively. Each of the end portions 121A, 121B is tapered in the direction from the proximal end portion 21A, 21B to the distal end portion 22A, 22B of the wings 20A, 20B. According to an embodiment, the main spar 12 has a circular cross-section. According to an embodiment, the end portions 121A, 121B are constrained to the distal end portions 22A, 22B, respectively.

According to an advantageous embodiment, the main spar 12 is an inflatable spar having preferably a tubular shape. Providing for at least one main spar 12 is particularly advantageous for high payload and large configurations. Alternatively, for low payload and small-size configurations, at least one main spar 12 made of composite material may be provided.

According to an embodiment, the airship 1 comprises a pair of main spars 12, which are preferably arranged parallel to each other.

According to an embodiment, each of said first and second wings 20A, 20B comprises at least one secondary spar 23A, 24A, 23B, 24B arranged inside the wing and having a cross-section with smaller dimensions than the aforesaid main spar 12. More in particular, according to an embodiment, the at least one secondary spar 23A, 24A, 23B, 24B has a smaller average cross-sectional area than an average cross-sectional area of the main spar 12. According to an embodiment, the at least one secondary spar 23A, 24A, 23B, 24B is tapered in the direction from the proximal portion 21A, 21B to the distal end portion 22A, 22B of the wings 20A, 20B. According to an embodiment, the at least one secondary spar 23A, 24A, 23B, 24B extends exclusively within the respective wing 20A, 20B. According to an embodiment, the at least one secondary spar 23A, 24A, 23B, 24B has a circular cross-section. According to an embodiment, the at least one secondary spar 23A, 24A, 23B, 24B is arranged to converge towards said at least one main spar 12 in the direction from the proximal portion 21A, 21B to the distal end portion 22A, 22B of each of said wings 20A, 20B.

According to an embodiment, each wing 20A, 20B of the airship 1 comprises a first secondary spar 23A, 23B and a second secondary spar 24A, 24B. According to an embodiment, the first and second secondary spars 23A, 24A and 23B, 24B of each of said wings 20A, 20B are arranged to converge with each other in the direction from the proximal end portion 21A, 21B to the distal end portion 22A, 22B of each of said wings 20A, 20B. In particular, the at least one main spar 12 is interposed between the first and second secondary spars 23A, 24A and 23B, 24B of each wing 20A, 20B.

According to a convenient embodiment, the at least one secondary spar 23A, 24A, 23B, 24B is an inflatable spar, preferably having a tubular shape.

According to an embodiment, the first and second wings 20A, 20B each comprise at least one wing rib 31A-33A, 31B-33B of planar shape and made of fabric which is crossed by said at least one main spar 12. According to an embodiment, each wing 20A, 20B comprises a plurality of wing ribs 31A-33A, 31B-33B, preferably three wing ribs 31A-33A and 31B-33B, which are crossed by the at least one main spar 12. According to an embodiment, the first and second side shell portions 11D, 11E each comprise an upper surface 111D, 111E and an opposite lower surface 112D, 112E. The at least one wing rib 31A-33A, 31B-33B joins the aforementioned upper and lower surfaces 111D, 112D and 111E, 112E of each of the side shell portions 11D, 11E so as to allow a predetermined aerodynamic profile of the wings 20A, 20B to be achieved when pressurized.

According to an embodiment, the central body 10 comprises at least one central body rib 13 which is crossed by the aforesaid at least one main spar 12. According to an embodiment, the central body 10 comprises a plurality of central body ribs 13, preferably three ribs 13, which are crossed by the at least one main spar 12. The at least one rib 13 has a planar shape and is made of fabric. Specifically, the central shell portion 11A-11C comprises an upper surface 111 and an opposite lower surface 112. The at least one central body rib 13 joins the upper and lower surfaces 111, 112 of the central shell portion 11A-11C so as to allow a predetermined aerodynamic profile of said central body 10 to be achieved when pressurized.

Figure 5:
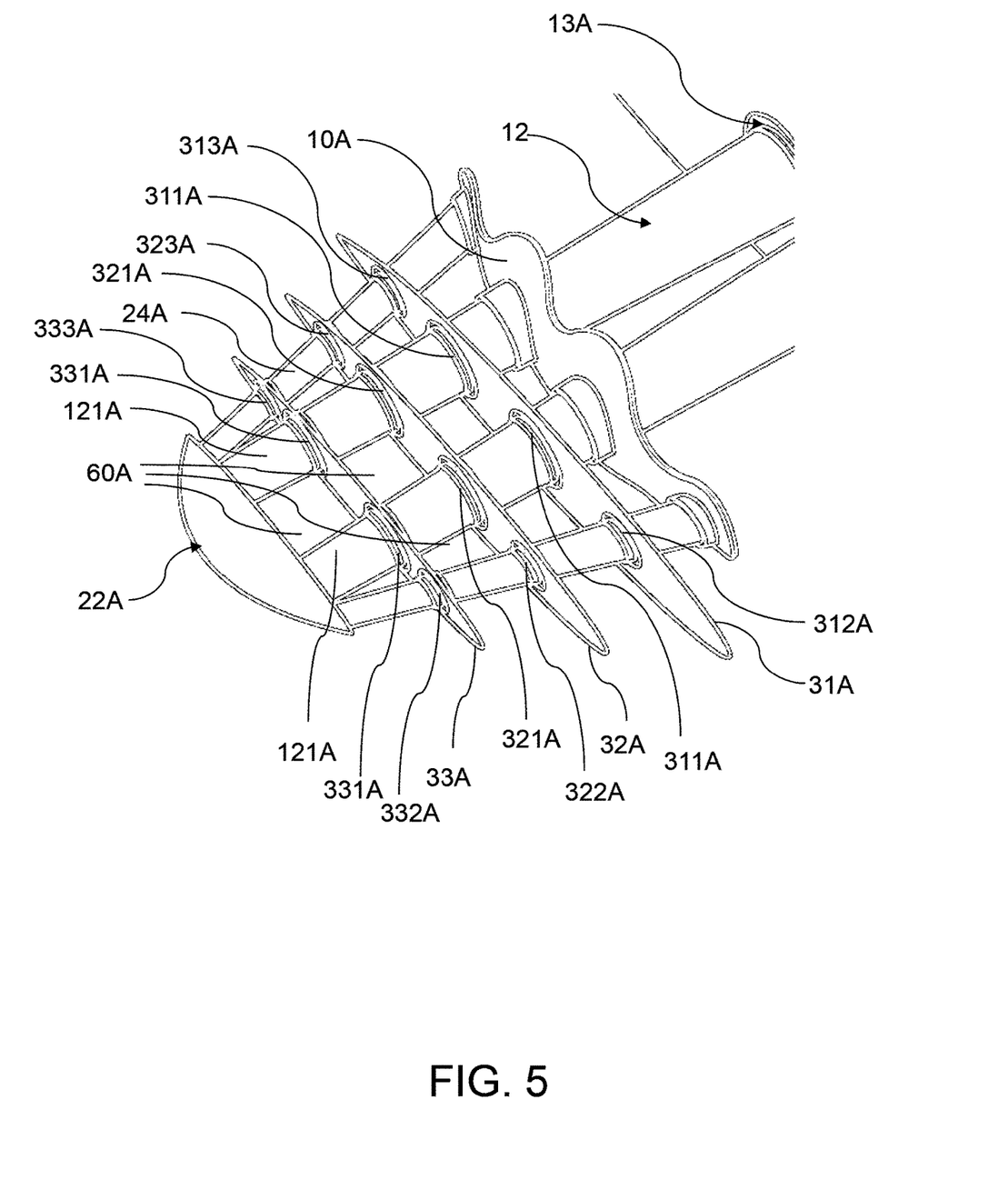
FIG. 5 is a perspective view of an enlarged detail in FIG. 4.

With reference to FIGS. 4-5, according to an embodiment, the at least one main spar 12 is connected with rib interfaces 13A, 311A, 321A, 331A to both the at least one rib 13 of the central body and the at least one wing rib 31A-33A, 31B-

33B of first and second wings 20A, 20B. According to an embodiment, the rib interfaces 13A, 311A, 321A, 331A comprise rigid or semi-rigid rings 13A, 311A, 321A, 331A, which are preferably made of composite materials. According to an embodiment, the airship comprises a plurality of rib interfaces 13A, preferably three rib interfaces 13A, each of which is interposed between the at least one main spar 12 and one of the ribs 13. According to an embodiment, the wing 20A comprises a plurality of rib interfaces 311A, 321A, 331, preferably three rib interfaces 311A, 321A, 331, each of which is interposed between the at least one main spar 12 and one of the ribs 31A, 32A, 33A. According to an embodiment, the secondary wing spars 23A, 24A of the wing 20A are connected with respective rib interfaces 312A, 322A, 332A and 313A, 323A, 333A to the at least one wing rib 31A-33A of the first wing 20A. According to an embodiment the rib interfaces 312A, 322A, 332A and 313A, 323A, 333A comprise rigid or semi-rigid rings 13A, 311A, 321A, 331A, which are preferably made of composite materials. According to an embodiment, the wing 20B comprises rib interfaces similar to the rib interfaces 311A, 321A, 331A and the rib interfaces 312A, 322A, 332A, 313A, 323A, 333A. As the wing 20B has an identical and symmetrical structure to the wing 20A, the rib interfaces of the 20B wing will not be described in further detail for the sake of brevity of description.

Again with reference to FIGS. 4-5, according to an embodiment the at least one main spar 12 is connected through central body interfaces 10A, 10B to the central shell portion 11A-11C. In particular, according to an embodiment, the rib interfaces 13A, 311A, 321A, 331A allow the passage of gas. Furthermore, the central body interfaces 10A, 10B are such as to allow not only a structural but also a pressure sealing connection between the central shell portion 11A-11C and the at least one main spar 12. Indeed, as described above, according to an embodiment, the central body 10 and the wings 20A, 20B define mutually separate chambers 60, 60A, 60B. In particular, the chambers 60, 60A, 60B are designed to operate at different pressures. More in particular, according to an embodiment under operating conditions and at the mission height of said airship 1, said central body and said first and second wings 20A, 20B are inflated to a lower pressure than the pressure with which the aforesaid at least one main spar 12 is inflated. For example, according to an embodiment, the main body 10 is inflated to a pressure of about 1000 Pa while the at least one main spar 12 is inflated to a pressure of about 10000 Pa. According to an embodiment under operating conditions and at the mission altitude of airship 1, the at least one secondary spar 23A, 24A, 23B, 24B is inflated to a pressure of about 10000 Pa.

According to an embodiment, the central shell portion 11A-11C comprises two half-shells 11A, 11B having semicircular or semi-elliptical section, from which the first and second wings 20A, 20B extend, and at least one intermediate portion 11C which joins said two half-shells 11A, 11B. According to an embodiment, the at least one intermediate portion 11C defines together with a pair of central body ribs 13 at least one compartment of the central body 10 having a substantially rectangular cross-sectional shape, i.e., a cross-sectional shape having a pair of mutually opposite straight sides defined by the pair of ribs 13 and a pair of mutually opposite convex sides defined by the central shell portion 11A-11C. According to an embodiment, the central shell portion 11A-11C comprises a pair of intermediate portions 11C adapted to define together with a plurality of ribs 13 a pair of central body compartments 10 having a substantially rectangular shape.

According to an embodiment, the airship 1 is configured to be able to generate an aerostatic buoyancy force equal to 30%-70% of the total weight of the airship 1 and simultaneously develop a lift equal to 70%-30% of the total weight of the airship 1 so that the sum of the aerostatic buoyancy force and lift equals the total weight of the airship 1 or is greater than the weight of the airship 1 if a change in altitude is required According to an embodiment, the airship 1 comprises at least one propulsion system 51, 52. According to an embodiment, the propulsion system 51, 52 comprises a rear propeller 51 arranged at the rear of the central body 10 and a pair of front propellers 52 arranged at the front of the central body 10 from two opposite portions of the central body 10. In particular, the rear propeller 51 is angularly adjustable about a vertical axis and the front propellers 52 are angularly adjustable about respective horizontal axes. According to an embodiment, the rear propeller 51 is disposed centrally relative to the central body 10 and preferably comprises a "stern thrust" motor. According to an embodiment, the propellers 52 are arranged symmetrically relative to the central body 10 and preferably each comprise a respective "vector thrust" motor. The arrangement of such motors 51, 52 is such to maximize the lever arms relative to the center of gravity of airship 1. According to an embodiment, the propellers 51, 52 are helical propellers. Advantageously, the arrangement of the front propellers 52, orientable around respective horizontal axes, makes it possible to obtain thrusts in the vertical plane useful to control the attitude of the airship 1 on the above vertical plane even at low speeds while the rear motor 51, orientable in the horizontal plane, allows the directional control of the airship 1 eliminating the need for a mobile vertical rudder. According to an embodiment, the propulsion system is fully electric. According to an embodiment, the airship 1 comprises a power generation system based on flexible solar panels 40 arranged on the outer shell 11 of the airship 1, preferably on the upper surface 111 of the central portion 11A-11C of the shell. In particular, the airship 1 is designed to be completely energy self-sufficient and able to remain airborne for several weeks. The airship 1 further comprises an energy storage system necessary to ensure flight at night, without necessarily having to decrease the flight altitude. According to an embodiment, the energy storage system comprises high energy density batteries, such as Li—Po, Li—ION, Li—S, etc.

According to an embodiment, the airship 1 comprises a bay 70 for the payload, a bay 80 for the avionics and the aforementioned batteries. The bays 70, 80 are preferably located on the outer shell 11 and more preferably on the central portion 11A-11C of the central shell 10. According to an embodiment, the airship 1 comprises control surfaces 203A, 203B positioned on the wings 20A, 20B. By varying the size of the control surfaces 203A, 203B and the wings 20A, 20B, it is possible to modulate the percentage of how much each aerostatic and aerodynamic thrust contributes to the total thrust required to balance the weight. Different optimal solutions can be achieved according to the payload, flight altitude and assigned cruise speeds.

According to an embodiment, the airship 1 has no ballonet to compensate for gas expansions as altitude changes. This solution makes it possible to significantly reduce the weight and size of the airship 1 compared to the classical known technique based on an airship-type configuration. Instead, according to an embodiment, only a small ballonet will be present to absorb the pressure variations due to the temperature excursions mainly due to the day-night alternation.

Figure 1:
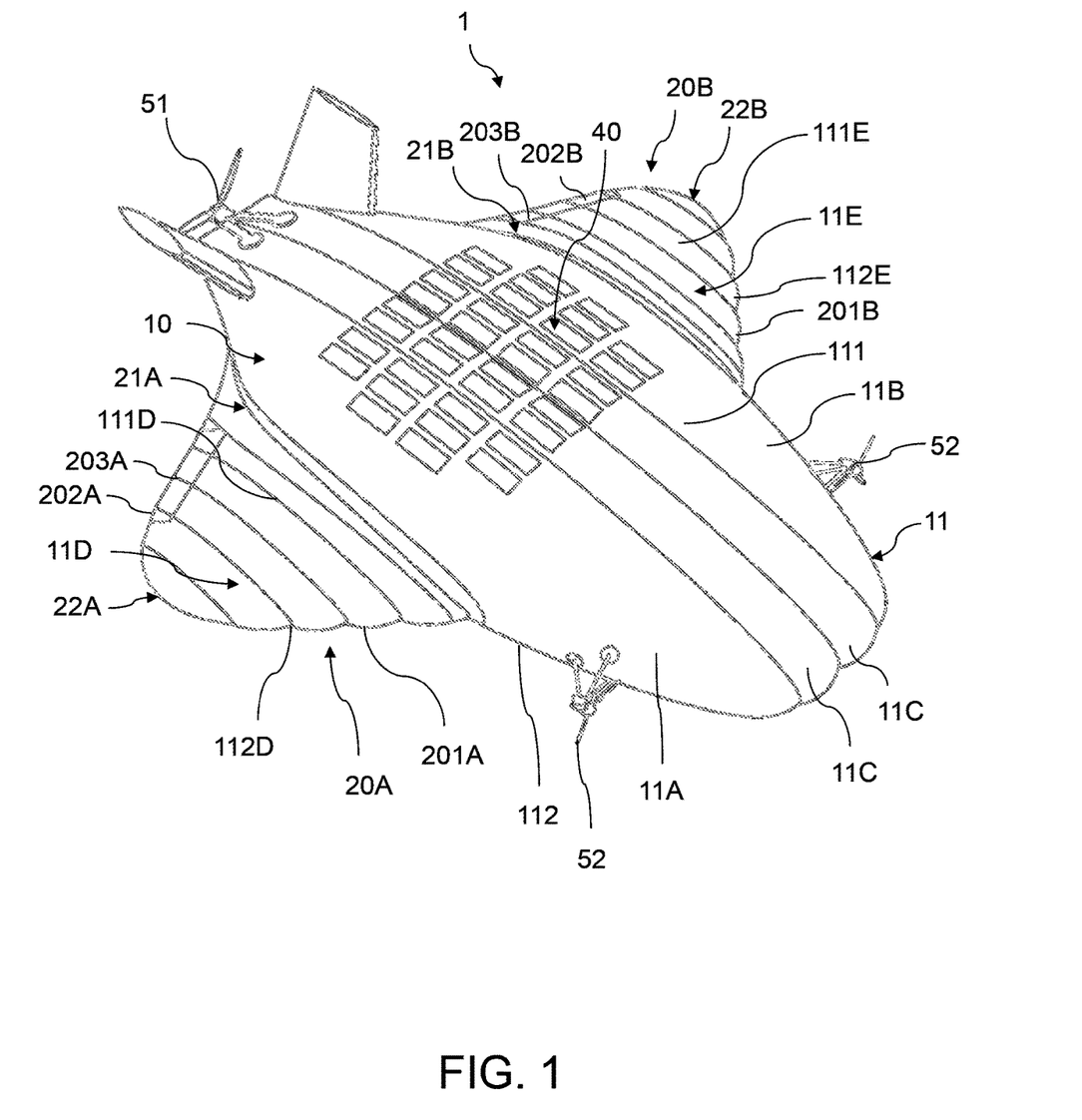
FIG. 1 is a diagrammatic perspective view from the top of a hybrid stratospheric airship according to a first embodiment.
Figure 7A:
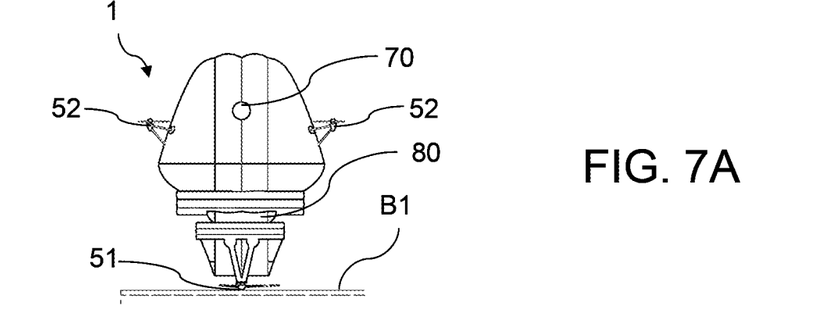
FIGS. 7A-7C are diagrammatic plan views from below of the airship in FIG. 1 in an initial takeoff configuration, an intermediate configuration, and a hybrid and aerodynamic mission configuration, respectively.
Figure 7B:
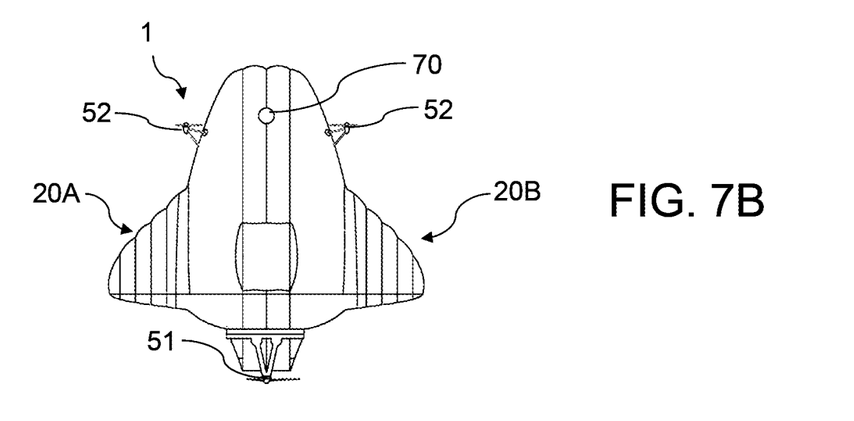
Figure 7C:
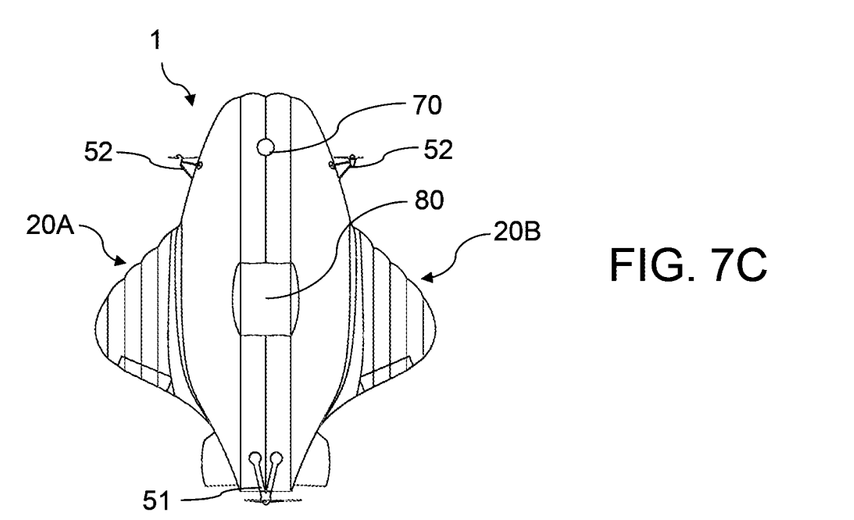
Figure 8A:
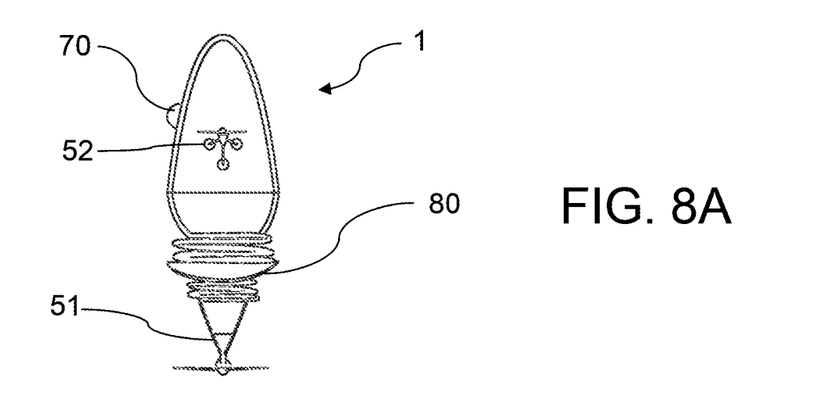
FIGS. 8A-8C are diagrammatic plan side views of the airship of FIG. 1 corresponding to the configurations of FIGS. 7A-7C, respectively.
Figure 8B:
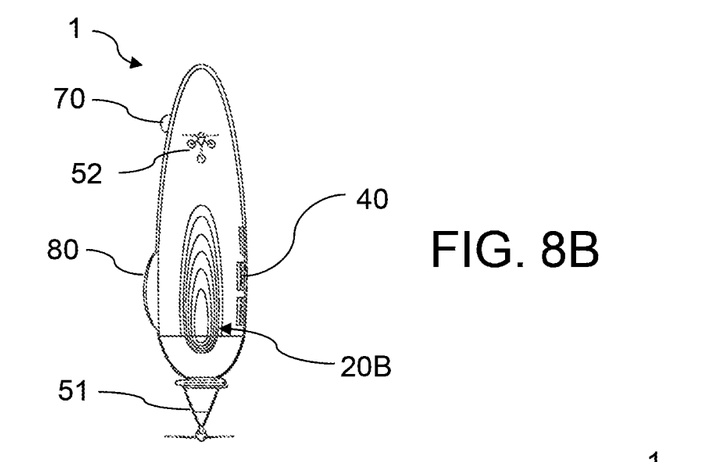
Figure 8C:
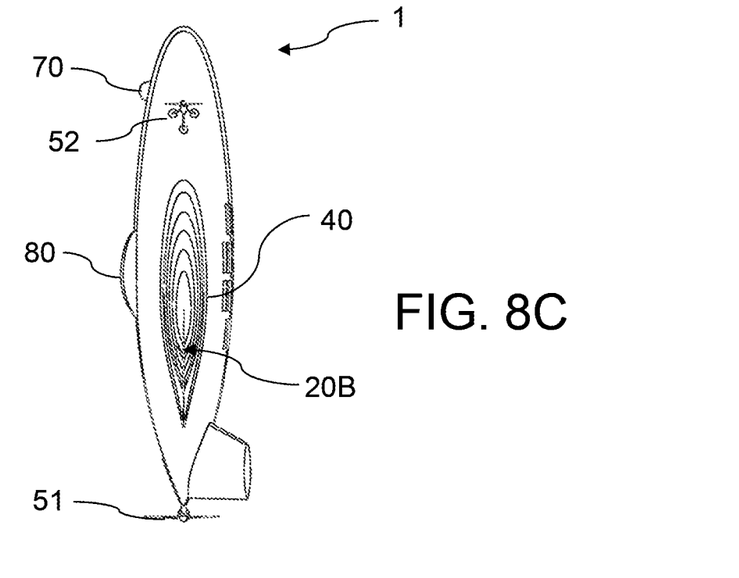

With reference to FIGS. 7A-7C and FIGS. 8A-8C, according to an embodiment, the geometric shape of the airship 1 changes in a predetermined manner from an initial minimum volume ground take-off shape (FIGS. 7A and 8A) to (FIGS. 7C and 8C), which a hybrid, aerodynamic shape corresponds to the shape of airship 1 shown in FIG. 1. As shown in FIG. 7A in the initial take-off configuration the airship 1 is placed vertically on the ground B1 and only a front portion of the central body 10 of the airship 1 is inflated. In such a configuration, the wings 20A, 20B are fully folded. According to an embodiment, the airship 1 is also adapted to take an intermediate form, shown in FIGS. 7B and 8B, in which the central body 10 and the wings 20A, 20B are partially inflated. According to an embodiment, the airship 1 takes the intermediate form (FIGS. 7B and 8B) at an altitude of about 8000 m and the hybrid and aerodynamic configuration (FIGS. 7C and 8C) at an altitude of about 15000 m.

Figure 6:
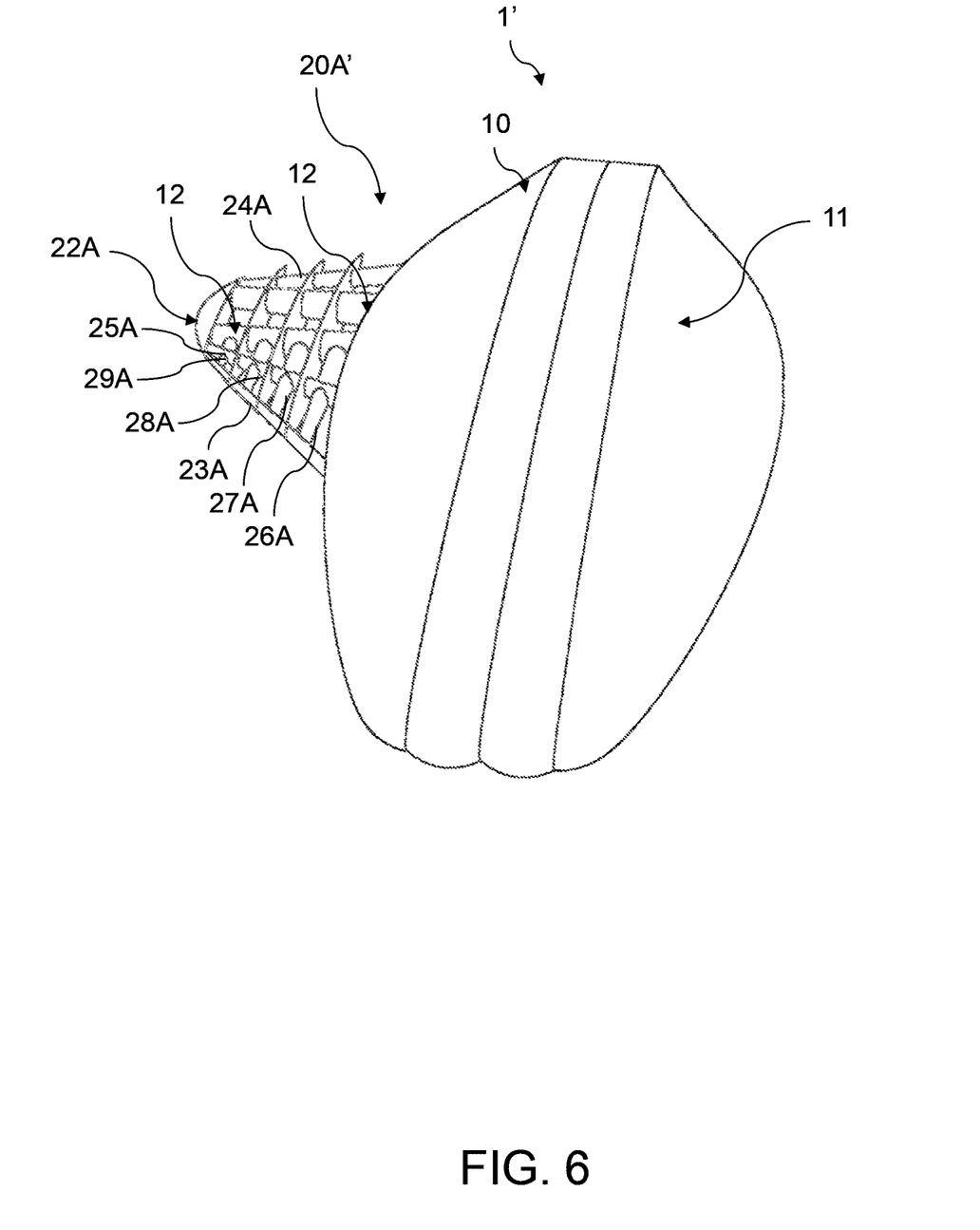
FIG. 6 is a diagrammatic perspective view of a second embodiment of a hybrid stratospheric airship in which some parts of the airship have been removed.

With reference now to FIG. 6, a hybrid stratospheric airship according to a second embodiment is indicated as a whole by reference numeral 1'. The airship 1' differs from the airship 1 shown in FIGS. 1-5 only in that it has wings with a slightly different structure than the wings 20A, 20B of the airship 1'. Therefore, everything described with reference to the airship 1, as compatible, is also applicable to the airship 1'. Therefore, for the sake of brevity of description, the airship 1' will not be described in detail again. It is worth noting in particular that in FIG. 6 some components of the airship 1' have not been shown. For example, only the first wing 20A' of the airship 1' has been shown in FIG. 6 in which the relevant portion of the outer shell 11 was removed to show the internal structure of the wing 20A'. However, it is apparent that the airship 1' has two wings having a symmetrical structure relative to the central body 10 as in the case of airship 1 described above. It is therefore apparent that the description provided below with reference to the wing 20A' will be applicable, mutatis mutandis, to the second wing (not shown) of airship 1'. Specifically, a first difference between the wing 20A' and the wing 20A of airship 1 is that the wing 20A' has the first secondary spar 23A which is arranged at the leading edge of the wing 20A'. A second difference between the wing 20A' and the wing 20A is that the wing 20A' comprises at least one strut 26A-29A interposed between the first secondary spar 23A and a main spar 12 of the airship 1'. Advantageously, providing the secondary spar 23A at the leading edge of the wing 20A and providing the at least one strut 26A-29A allow to preserve the profile shape of the wing 20A preventing or significantly reducing leading edge deformation as internal pressure increases in the wing 20A. According to an embodiment, the wing 20A' comprises a plurality of struts 26A-29A, preferably four struts 26A-29A, which are interposed between the first secondary spar 23A and a main spar 12 of the airship. According to an embodiment, the wing 20A' comprises, in addition to the first and second secondary spars 23A, 24A, also a third secondary spar 25A which is interposed between the first secondary spar 23A and the main spar 12. In such a case, the at least one strut 26A-29A extends partly between the first spar 23A and the third spar 25A, and partly between the third spar 25A and the main spar 12. According to an embodiment, the at least one strut 26A-29A is an inflatable strut. According to an embodiment, the at least one strut 26A-29A is in fluidic communication with the first secondary spar 23A and the main spar 12 of the airship 1'. According to an embodiment, the at least one strut 26A-29A is also in fluidic communication with the third secondary spar 25A. However, it is also worth noting that by slightly modifying the structure of the wings 20A, 20B of the airship 1 shown in FIGS. 1-5, one or more struts similar to the struts 26A-29A interposed between the first secondary spar 23A and at least one main spar 12 of the airship 1 may also be provided in the wings 20A, 20B of the airship 1.

Having structure of hybrid described the stratospheric airships 1,1', an operational mode of such airships 1, 1' is now briefly described by way of example.

At take-off, the airship 1, 1' has a generally ellipsoidal shape and its weight is balanced only by the aerostatic thrust, which also provides the free lift necessary for ascension. In this manner, takeoff is performed vertically without the need for aerodynamic thrust. The take-off phase, which by choice is therefore uncontrolled or at most partially controlled, will see an initial phase in which the gas expands until it completely occupies the available volume in the central body and in the wings. As the system ascends, the shape continuously transforms from ellipsoid to a hybrid, load-bearing design shape (FIG. 1). This phase ends at a predetermined altitude (e.g. 8000-12000 m, according to the size of the airship 1, 1') in which the airship 1.1', having acquired its shape, can generate aerodynamic thrust. Once the aerodynamic shape has been acquired, the second part of the ascent phase begins, which at this point will make use of both the aerostatic thrust and the aerodynamic thrust generated by the advancement, relative to the air, of the airship 1, 1' at a predetermined speed. In this phase, the expansion of the gas will not be structurally contained and the excess gas will be released, the lift will balance the part of the weight that will no longer be aerostatically supported.

Upon reaching the required flight altitude (e.g. 17000-21000 meters), the airship 1, 1' will begin its mission. Two flight modes are possible according to the wind strength. A first mode is geostationary with respect to an area of interest and is possible when the wind is in the range of 5-18 m/s. In this mode, the airship 1, 1' uses the relative wind to generate lift while remaining stationary relative to the ground. For winds of lower strength, the platform must move on trajectories, which can be circular or rectilinear and will allow developing the necessary lift to complement the aerostatic thrust. Obviously, the aerodynamic thrust will also be able to compensate for aerostatic thrust losses related to gas leakage, which are unavoidable in particular in a helium-filled system which is intended to remain airborne for a prolonged period of time. In the descent phase, the loss of internal pressure due to altitude will be compensated by introducing, in a controlled and continuous manner, air into the shell to maintain the necessary shape useful to support and control the platform in descent to the landing surface. At this stage, the system will also be assisted in control by the electric motors which draw on the energy reserve stored in the batteries.

Based on the foregoing, it can therefore be understood how a hybrid stratospheric airship according to the present description can achieve the above-mentioned purposes.

Without prejudice to the principle of the invention, the embodiments and the constructional details may be broadly varied relative to the above description disclosed by way of non-limiting example, without departing from the scope of the invention as defined in the appended claims.

The invention claimed is:

1. A hybrid stratospheric airship configured for the combined and optimized use of aerostatic and aerodynamic force, the hybrid stratospheric airship comprising:
   an inflatable central body;
   a first and a second inflatable wing which each extend from the central body protruding laterally from two opposite sides of said central body, each of said wings having a portion which is proximal to the central body, an end portion which is distal from said central body, a leading edge, and an trailing edge;
an outer shell having a central shell portion associated with said central body, and a first and a second side shell portion associated with said first and second wing, respectively;
at least one main spar extending transversely to said central body, wherein the at least one main spar is an inflatable spar, which structurally supports said first and second wings and crosses said central body, said at least one main spar being a rectilinear spar that is interposed between the leading edge and the trailing edge of said first and second wings, and that is connected to said distal end portions of said first and second wings,
wherein said first and second wings each comprise at least one planar wing rib made of fabric which is crossed by said at least one main spar, wherein the first and second side shell portions each comprise an upper surface and an opposite lower surface, wherein said at least one wing rib joins said upper and lower surfaces of each of said side shell portions so as to allow a preset aerodynamic profile of said wings to be obtained, once pressurized,
wherein the central body comprises at least one central body rib which is crossed by said at least one main spar, said at least one central body rib being planar in shape and being made of fabric, wherein the central shell portion comprises an upper surface and an opposite lower surface, wherein said at least one central body rib joins said upper and lower surfaces of the central shell portion so as to allow a preset aerodynamic profile of said central body to be obtained, once pressurized,
wherein said at least one main spar is connected with rib interfaces to said at least one central body rib and said at least one wing rib of said first and second wings, wherein said at least one main spar is further connected to said central shell portion by central body interfaces, wherein said rib interfaces allow the passage of gas, and wherein said central body interfaces are such as to allow a structural connection and a pressurized sealing connection between said central shell portion and said at least one main spar.

2. A hybrid stratospheric airship according to claim 1, wherein said at least one main spar is a spar made of composite material.

3. A hybrid stratospheric airship according to claim 1, wherein each of said first and second wings comprises at least one secondary spar arranged in the wing and having a cross-section with smaller dimensions than a cross-section of said at least one main spar.

4. A hybrid stratospheric airship according to claim 3, wherein said at least one secondary spar comprises a first and a second secondary spar arranged so as to converge with each other from the proximal portion to the distal end portion of each of said wings, wherein said at least one main spar is interposed between said first and second secondary spars.

5. A hybrid stratospheric airship according to claim 3, wherein said at least one secondary spar is an inflatable spar.

6. A hybrid stratospheric airship according to claim 3, wherein said at least one secondary spar is one secondary spar, which is arranged at the leading edge of said first and second wings.

7. A hybrid stratospheric airship according to claim 3, comprising at least one strut interposed between said at least one secondary spar and said at least one main spar.

8. A hybrid stratospheric airship according to claim 7, wherein said at least one strut is an inflatable strut.

9. A hybrid stratospheric airship according to claim 1, wherein said central body and said first and second wings define a central body chamber, a first wing chamber, and a second wing chamber, respectively, that are separate from one another and are inflatable in an independent manner.

10. A hybrid stratospheric airship according to claim 1, wherein under operating conditions and at the mission height of said airship, said central body and said first and second wings are inflated with a lower pressure than the pressure with which said at least one main spar is inflated.

11. A hybrid stratospheric airship according to claim 1, wherein the central shell portion comprises two half-shells having semi-circular or semi-elliptical section, from which said first and second wings extend, and at least one intermediate portion which joins said two half-shells.

12. A hybrid stratospheric airship according to claim 1, further comprising a propulsion system including a rear propeller arranged in the rear part of said central body, and a pair of front propellers arranged in the front part of said central body on two opposite sides of the central body, wherein the angle of the rear propeller is adjustable about a vertical axis, and the angles of the front propellers are adjustable about respective horizontal axes.

* * * * *